United States Patent [19]

Siversson

[11] Patent Number: 4,976,677

[45] Date of Patent: Dec. 11, 1990

[54] PROCESS FOR THE PRODUCTION OF FILTERS, AND A FILTER PRODUCED BY THE PROCESS

[75] Inventor: Per-Erik Siversson, Munkedal, Sweden

[73] Assignee: Flodins Filter AB, Lysekil, Sweden

[21] Appl. No.: 377,838

[22] PCT Filed: Nov. 12, 1987

[86] PCT No.: PCT/SE87/00532

§ 371 Date: Jun. 21, 1989

§ 102(e) Date: Jun. 21, 1989

[87] PCT Pub. No.: WO88/03833

PCT Pub. Date: Jun. 2, 1988

[30] Foreign Application Priority Data

Nov. 17, 1986 [SE] Sweden .................. 8604893

[51] Int. Cl.[5] .................. B01D 27/06; B05B 1/14
[52] U.S. Cl. .................. 493/413; 493/416; 493/425; 493/434; 493/941; 55/500; 55/521; 55/DIG. 5; 210/232; 210/493.3; 156/474
[58] Field of Search .......... 493/346, 347, 354, 381, 493/382, 941, 243, 264, 267, 405, 413, 417, 419, 423, 416, 425, 434, 463; 210/445, 451, 484, 489, 493.3, 493.5, 232; 55/497, 500, 521, DIG. 5; 156/474

[56] References Cited

U.S. PATENT DOCUMENTS

| | | | |
|---|---|---|---|
| 3,127,341 | 3/1964 | Abeles | 210/493.3 |
| 4,243,943 | 4/1966 | Getzin | 210/493.3 |
| 4,589,983 | 5/1986 | Wydeuar | 210/493.3 |
| 4,617,122 | 10/1986 | Kruse et al. | 210/493.3 |
| 4,728,426 | 3/1988 | Rudinger et al. | 210/493.5 |
| 4,798,575 | 1/1989 | Siversson | 493/346 |

FOREIGN PATENT DOCUMENTS

3542963 6/1987 Fed. Rep. of Germany.

*Primary Examiner*—Richard V. Fisher
*Assistant Examiner*—Wanda L. Millard

[57] ABSTRACT

Process for the production of filters whose active filtering part is made up of a folded filter material web, preferably made from paper, which folded web is delimited in the process by side edges at which the folds terminate, and end edges at which a first or last fold is located, so that in this way filter units (49) are formed. The filter units (49) are produced in an automatized process in which the filter material web is creased and pushed together to form the folds. The spacings between the folds are maintained constant by means of a screw element with threads pushing down between the folds and forming spacing elements between these. The screw element is rotataed during forward movement of the folded web. Glue-coated strips are pressed onto the said side edges of the web, so that the ends of the folds are covered over by the strips. The blank, which is thus continuously produced and which comprises the folded material web and the strips glued onto its side edges, is cut off to form the filter units (49). Several such filter units (49) are assembled in a casing (69) to form a filter having a filter surface which corresponds to the combined surface of the units included.

3 Claims, 9 Drawing Sheets

PROCESS FOR THE PRODUCTION OF FILTERS, AND A FILTER PRODUCED BY THE PROCESS

TECHNICAL FIELD

The present invention relates to a process for the production of filters, and to a filter produced by the process. It relates more particularly to those filters (and their production) whose active filtering part is made up of a folded filter material web, preferably made from paper, which folded web is delimited in the process by side edges at which the folds terminate, and end edges at which a first or last fold is located, so that in this way filter units are formed, in which connection, in the production of the filter units, a blank is first produced in an automatized process in which the filter material web is creased and pushed together to form the folds with formation of predetermined spacings between the folds during advancement of the folded web, and the said side edges of the web are joined by means of strips, such that the ends of the folds are covered over and fixed by means of the strips, and thereafter this blank, which is thus produced continuously and which comprises the folded material web and the strips arranged on its side edges, is cut off to form the filter units.

PRIOR ART

There exist, for a number of different filtering purposes, filters which use as their filtering element a folded filter material web, generally employing a pervious paper. Such filters are normally intended to have a limited service life after which they are replaced by a new, clean filter. The cleaning and maintenance of the filter element itself is therefore only possible, in the case of dry and pulverulent impurities, by blow cleaning occasionally between the replacements.

Filters of this type are produced conventionally in different sizes and shapes where the filter material web forms configurations such as parallelepipedic bodies, cylindrical bodies, or with other shapes in larger or smaller sizes. These bodies can be completed with sealing strips of different types and are generally intended to be inserted in filter housings which constitute a permanent piece of equipment. However, there are also filters of this type which have a filter housing which is intended to be discarded together with the filter, so that the entire filter unit is exchanged at one replacement.

Technical Problem

In the case of filters which are in this way intended (at least their filtering unit itself) to have a limited lifetime, it is important that the production costs be kept low, so that the replacements do not impose an excessive economic burden on the user. Since the filters must have a number of different designs and sizes depending on the application, it is difficult to achieve a highly automatized manufacture, except possibly for certain types which are used in large numbers. There is thus a problem involved in achieving an efficient manufacture also for those filters which are not used in very large numbers.

Solution

The said problem is solved in the invention by the process being carried out such that the spacings between the folds are maintained constant on application of the strips and during the advancement by means of the threads of at least one screw element pushing down between the folds, which threads thus form spacing elements, and the rotating of the screw element or elements, such that the threads follow the folds during the advancement, and such that several filter units produced in this way are assembled in a casing to form a filter having a filter surface which corresponds to the combined surface of the units included.

Advantages

The present invention provides a process for the manufacture of filters, and a filter produced by the process, which permits a highly automatized manufacture even where the numbers are relatively small.

DESCRIPTION OF THE FIGURES

The attached drawings show a number of embodiments of the invention.

PREFERRED EMBODIMENTS

The overall idea of the invention is that a large number of filter models are assembled from one model, or several models, of a filter unit. Instead of adapting the construction of a filter by designing the in-going elements in a size which is adapted to the size of the filter, the filter is constructed of modules of one size or several sizes, and these module units then form assembled filters of the size which is suitable for the application purpose in question.

However, such a construction alone is not sufficient for achieving the desired objective—a greater automatization of the filter manufacturing also for filters which are manufactured in smaller numbers. The inventive concept does, however, also involve the in-going units being manufactured in an automatized process, which will be described below. This means that the greater part of the manufacturing can take place automatically, and all that remains not automatized is the assembly of the module units of greater filter sizes. However, a large part of the manufacture of these filters too takes place automatically and with material supply and material design adapted to large series.

In addition, the automatized part of the manufacture can be carried out with high precision, so that the filter units included in the produced filters provide a reliable and uniform functioning.

Figure 1:
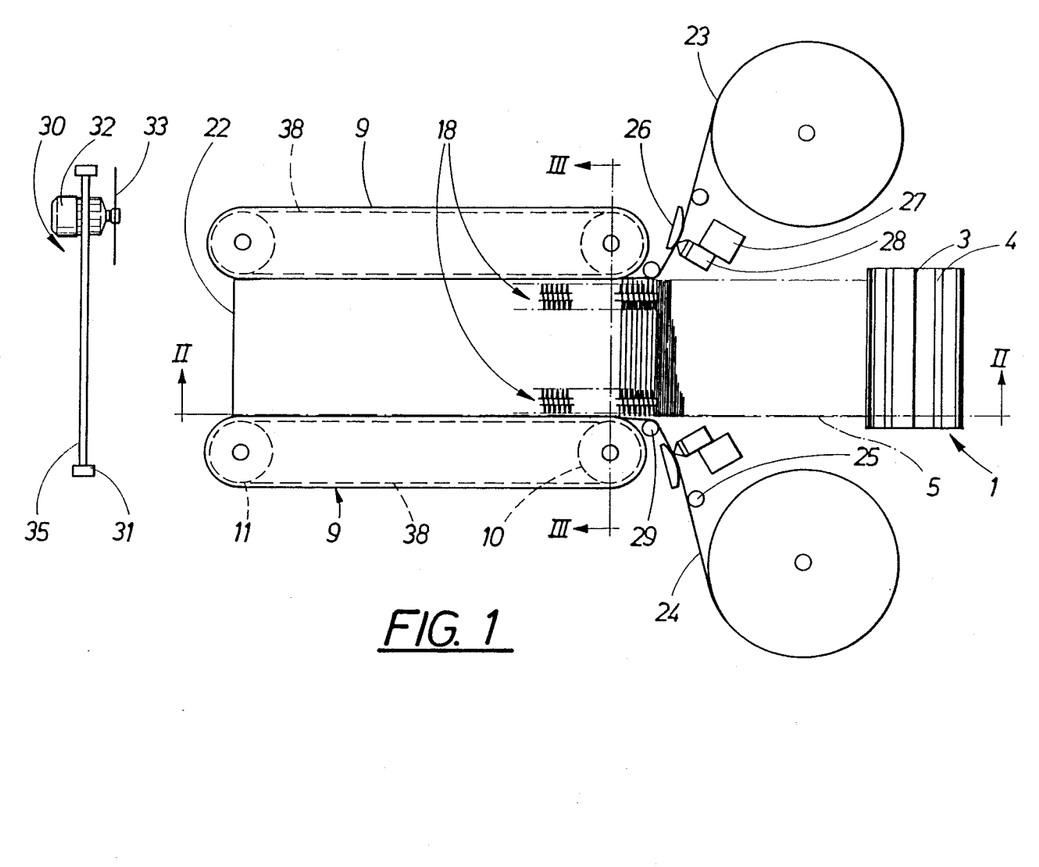
FIG. 1 shows a machine for the production of filter units, seen schematically in a plan view.
Figure 2:
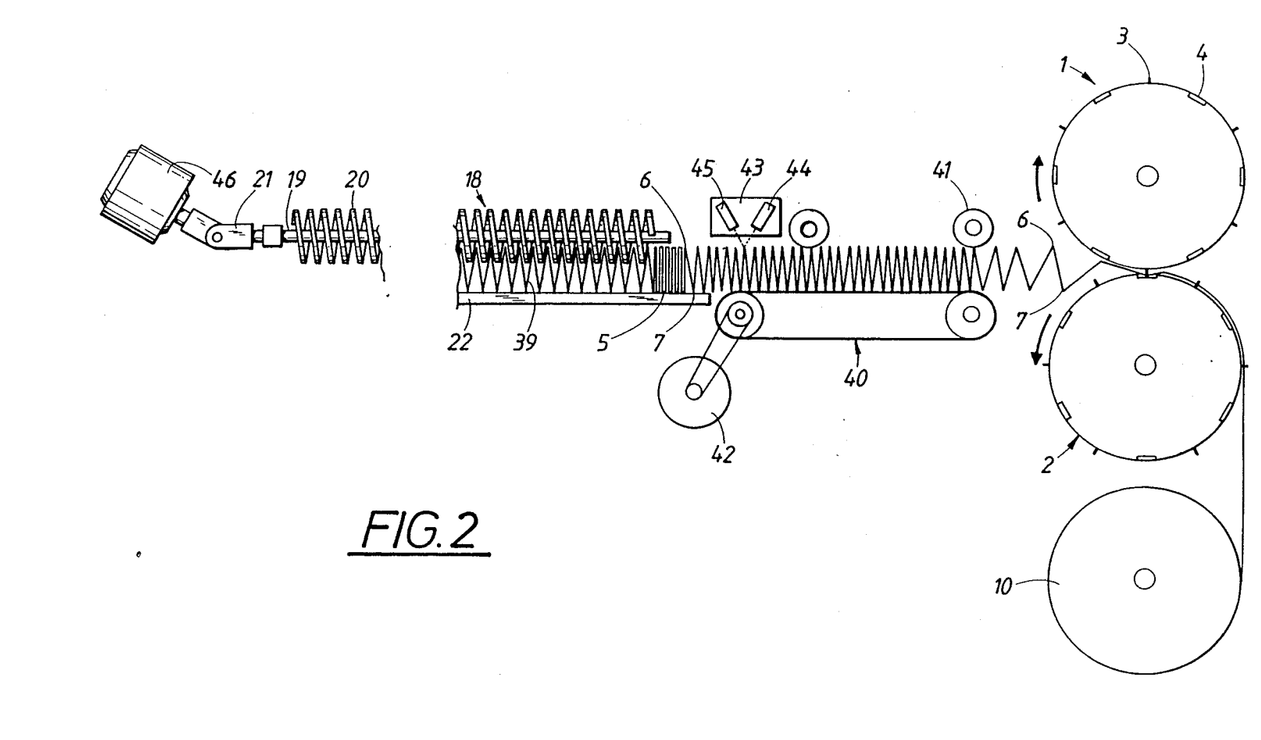
FIG. 2 shows the same machine seen in a side view.

The production of the module units takes place at a number of stations, as shown schematically in FIGS. 1 and 2, in which connection a first station (see in particular FIG. 2) comprises two cylinders 1, 2 which are rotatable on horizontal axles and lie close to each other and are each provided alternately on their contact surfaces with outwardly projecting folding strips 3 and recesses 4, preferably provided with an elastomeric material. The folding strips on the first cylinder 1 are intended to lie directly in line with the recesses on the second cylinder 2, and vice versa as the cylinders rotate. Between the cylinders there extends a web 5 of a filter material of a certain pore size and pore density, which web is preferably fed from a storage roll (not shown in the drawings) for the material, in which connection the folding strips 4 and the recesses 5 are intended to cooperate in order to shape the filter material such that, alternately, inner foldings 6 and outer foldings 7, so-called creasings, are formed transverse to the feed direction of the filter material and in turn form folds 39, as shown in FIG. 2.

Figure 3:
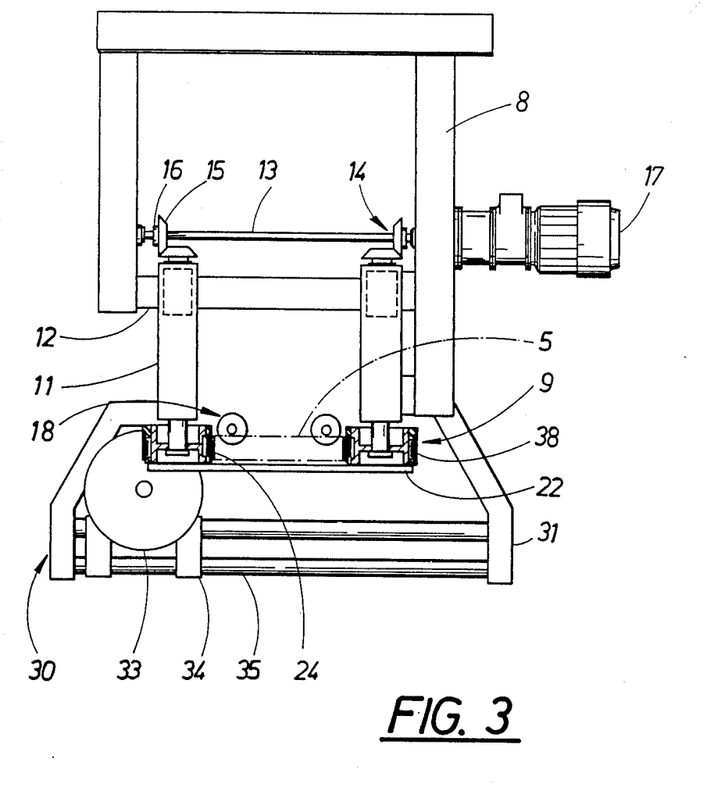
FIG. 3 shows the machine in an end view.

As shown in FIG. 3, a second station is located at a distance from the first station, which second station comprises conveyors 9 arranged on a support frame 8 vertically along the longitudinal direction of the web 5, preferably of the conveyor belt type comprising conveying belts 38 which run continuously between guide rolls 10 and drive rolls 11. The drive rolls and guide rolls are arranged adjustably on the support frame by means of a support element 12. The drive rolls are furthermore in driving cooperation with a drive axle 13 arranged rotatably on the support frame via a conical gear 14 comprising conical gear wheels 15, in which connection the gear wheels arranged on the drive axle are fixed in position in contact with the gear wheels of the drive rolls by means of clamp rings 16. The drive axle is rotatably mounted in bearing points on the support frame 8 and with its one end securely connected to a power source 17 arranged on the said support frame, preferably an electric motor as shown in FIG. 3.

To the inside of and at a distance from and parallel to the conveyors 9 there are arranged two horizontal, elongate screw elements 18, each essentially consisting of a metal strip 20 extending peripherally around an axle 19 with a certain pitch running along the axle. The ends of the axle are mounted in bearing points (not shown in the drawings). Furthermore, one end part of each screw element 18 is provided with a coupling 21, preferably of the cardan joint type, for driving by means of a power source (not shown in the drawings). The screw elements can alternatively be connected to the power source 17 of the conveyors. Furthermore, the creased web 5 can be fed forward by a belt conveyor 22 or, as shown, slide on a table arranged under the conveyors 12 and the screw elements 18.

On both sides of and at a distance from the creased web 5 at the end of the conveyors 9 facing towards the cylinders 1, 2, storage drums 23 are rotatably arranged around vertical axles. An elongate, dimensionally stable band of material 24, preferably of paper, is coiled around these storage drums as shown in FIG. 1. From each storage drum 23 the band of material 24 can extend past a backing roll 25 and onwards between a dolly 26, having a slightly convex surface which can be heated, and a gluing device 27 arranged opposite the dolly and on the other side of the band of material 24 and provided with gluing magazine 28. Each band of material 24 extends onwards past and around a second guide roll 29 arranged in a position in front of the guide roll 10 of the conveyor and in between the conveyor and the side edge of the creased and folded web 5.

Downstream of the said second station there is, as shown in FIGS. 1 and 3, a cutting device 30 in the form of a flying saw, and comprising a second support frame 31 which is intermittently movable between two extreme positions in the longitudinal direction of the conveyors by means of a drive arrangement (not shown), and a saw arrangement essentially consisting of a second power source 32, such as an electric motor and a saw blade 33. The saw arrangement is slidably arranged by means of support arms 34 on guides 35 transverse to the longitudinal direction of the creased web.

The process for producing the unit 36 will now be described with reference to the figures. As indicated above, the production of the foldings 6, 7, the so-called creasings, is effected by means of the cylinders 1, 2 which also feed the web 5 from the storage roll (not shown). The rotation of the cylinders is set relative to each other in such a way that, when the bearing surfaces of the respective cylinders bear against the web 5, one of the folding strips 3 on the first cylinder 1 always bears over one of the recesses 4 on the second cylinder 2 and thereby presses the web 5 down, in which connection the inner folding 6 is formed, and that one of the folding strips 3 on the second cylinder 2 always bears against the web 5 over one of the recesses 5 on the first cylinder 1, in which connection the web is pressed upwards so that the outer folding 7 is formed. Folding is effected alternately by means of the cylinders continuously rotating towards each other. The depth of the folds 39 thus depends on the distance between the folding strip and the recess. By means of the continuous production of the foldings 6, 7 by means of the cylinders, the now creased web 5 is fed with low friction across a support surface arranged between the first and the second stations, this not being shown in the drawings, on towards the screw elements 18 arranged at the second station for further transport via the said second station. The rotational speed of the cylinders 1, 2 depends on the speed of the screw elements 18 for feeding the folded web forward. The feeding speed of the cylinders shall at all times be greater than the feeding speed of the screw elements 18, in such a way that the web is folded and pushed together towards the end parts of the screw elements 18, as shown in FIG. 2, in which connection the pushing forward of the creased web preferably takes place in a pressed-together state on the support surface.

The creased web is thus fed by means of the cylinders 1, 2 on towards the screw elements 18 in the second station across the support surface, in which connection the distance between the vertical conveyors 9 slightly exceeds the width of the web 5. The distance between the conveyors can be regulated by pushing the one conveyor sideways towards the second conveyor by shifting the guide roll 10 and the drive roll 11 along the support elements 12 on the support arm 8.

When the screw elements 18 rotate, the thread of the metal strip 20 is brought down into the space between two folds and thereby separates the folds from each other at a certain defined distance, depending on the pitch of the screw, the distance between the threads and the depth of the thread flight. The creased web 5, bearing against the belt conveyor 22, is screwed forwards by the screw elements 18 and fed by the conveying belts 38 of the conveyors 9 in contact with the band of material 24, which in turn is pressed against the side edges of the web 5. The folds are thus kept by the screw elements 18 at a defined distance from each other in an upright position and are preferably locked in (viewed from the side) a zig-zag pattern while the screw elements 18 and the conveyors 9 are in engagement with the web.

In this connection, the position of the screw elements 18 projects slightly forward relative to the position of the conveyors in such a way that the flanges 20 come into engagement and separate the folds a moment before the conveying belts 38 of the conveyors 9 come into engagement with the web 5, in which connection the folds are freely permitted to form the said zig-zag pattern on the support surface, in order thereafter to be fixed in their mutual position by means of the conveyors, the screw elements and the belt conveyor 22.

At the same time as the creased web 5 is advanced, the band of material 24 is rolled off at the same speed from the storage drums 23, by means of the band of material being firmly gripped between the conveying belt 38 of the conveyors 9 and the side edges of the web. After the band of material has been rolled off from the storage drums, each band 24 is guided by means of the backing roll 25 in towards the dolly 26, which is arranged relative to the said backing roll in such a way that as the band is advanced it bears against the convex surface of the dolly, as shown in FIG. 1. In this connection, the dolly is provided with heating elements which heat the convex surface which, by means of heat conduction, in turn heats the band 24 running across the convex surface, in order to heat the glue strand applied from the gluing device 27 onto the band, preferably of the melting glue type. However, in this connection there is no requirement for the surface of the dolly to be heat-generating in order to heat the band, but rather the gluing magazine 28 arranged on the gluing device can be provided with any type of known heating element which heats the melting glue to a certain temperature for subsequent application to the band by means of the gluing device 27. It is important that the glue strand, which has a defined thickness, is not caused to move during the advance of the band 24 towards the creased web 5.

Each band 24 is fed further forward across the second guide roll 29 with the glue-coated surface directed away from the roll towards the web 5 in between the conveyor 9 which presses the glue-coated surface against the side edges of the folds separated by the screw elements 18, in which connection the hardening glue strand forms a mass which, by being squeezed out by means of the band bearing against the side edges, escapes between the side edges of the folds and thereby forms spacing elements which fix the folds in this position. In this connection, the width of the band is at least identical to the spacing between the inner folding 6 and the outer folding 7 of the creased web in the upright position, so that the entire edge section of the web is covered by means of the band 24 and is fixed in the defined position by means of the hardening glue stand during the advance of the web by means of the screw elements and the conveyors.

At the end of the second station, i.e. at the end of the conveyors 9, at the drive rolls 11 the flying saw 30 works intermittently along the longitudinal direction of the web between two end positions. The speed at which it moves is synchronized with the advance speed of the web. The saw 32, 33 is, in an initial position, at a certain distance from the drive rolls 11 of the conveyors in its first end position on the guides 35, as shown in FIG. 1. The saw 32, 33 is fed along the guides 35 to the opposite side and the saw blade 33 cuts through the creased web 5, at right angles relative to the longitudinal direction of the web while following the advance of the web in such a way that a straight cut is obtained across the web. The advance of the saw is suitably effected by the upper side of one of the guides 35 having gears, such as a gear rack, in which connection the same motor 32 can drive both the saw blade 33 and the advance of the saw along the guide by means of a certain defined gear ratio. When the web is sawn through and the saw 32, 33 has reached its second end position on the guides 35, as shown in FIG. 3, the flying saw returns to its initial position at the end of the second station, and a new sawing cycle can be initiated, depending on the predetermined length of the finished unit 36. In this way the unit 36 is formed whose longitudinal edges thus consist of the band of material 24 and whose ends consist of foldings 6, 7 of the filter material. The saw can work in both directions between the end positions of the guides 35 or only in one direction between the end positions of the guides.

Figure 4:
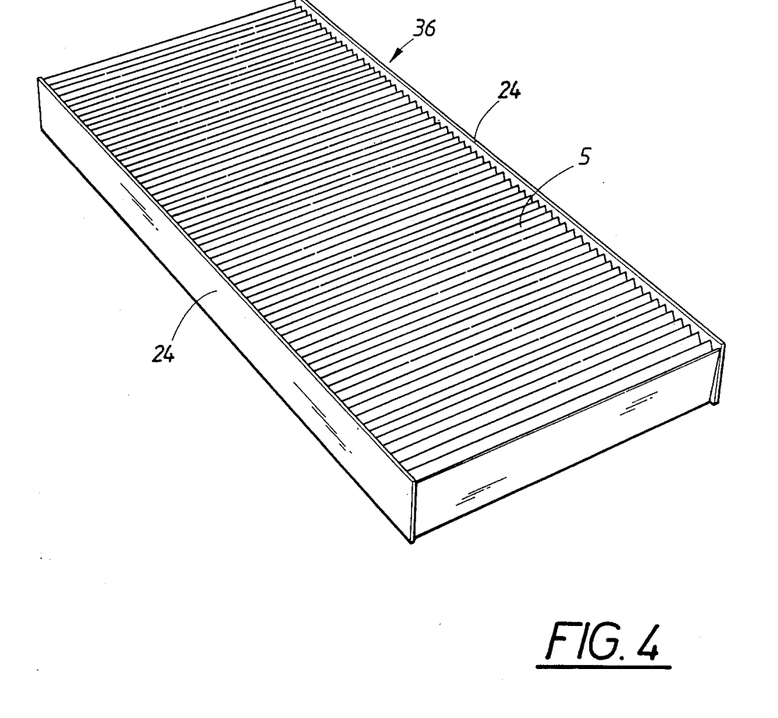
FIG. 4 shows a filter unit in perspective in a first design.

As is shown in FIG. 4, a filter unit 49 produced by means of the process has elongate edge sections of the band material 24, in which connection the ends of the filter each consist of one of the folds 39 of the filter material from the web 5. The unit 49 manufactured in the automatic process is kept for as long as possible in one or several sizes in all types of filters, which are thus composed of several units 49. However, it may also be expedient for several different sizes to be manufactured in the same process. It is particularly easy to design the units with different lengths, since it is only necessary to readjust the cutting arrangement 30 for this purpose. As is shown in FIG. 4, the unit 49 is not intended to be used as a complete filter in this form, since it is difficult to incorporate this unit into a filter housing in such a way that the medium, which is to be filtered, is forced through the folded filter web with complete sealing around its edges. It is therefore necessary to complete the unit in different ways in order to permit its incorporation.

Figure 5:
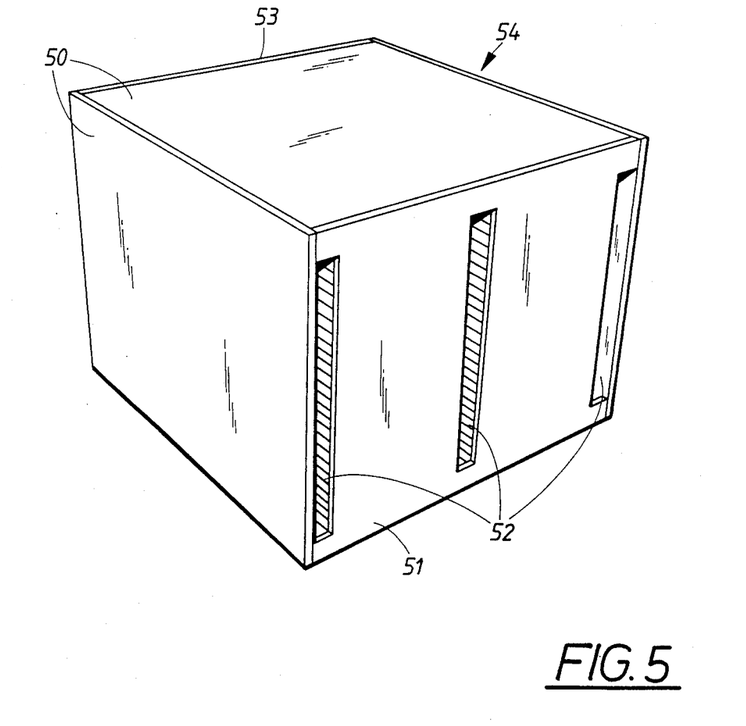
FIG. 5 shows an assembled filter of a first type in perspective.

FIG. 5 shows a filter with a box shape. The filter has uninterrupted side surfaces 50 and a front side 51 with narrow openings 52. Opposite the front side 51 there is a rear side 53 (not shown in the figure) which is also provided with narrow openings. Inside the filter there are filter units 49 of the type shown in FIG. 4. They are arranged in the box, which is formed by the walls 50, 51, 53 of what will hereinafter be referred to as the casing 54, in such a way that a medium, which is to be filtered and passed in through the narrow openings in one of the sides 51, 52, must pass through a wall of the filter material in one of the incorporated units before the medium can pass out through the narrow openings in the opposite side.

Figure 6:
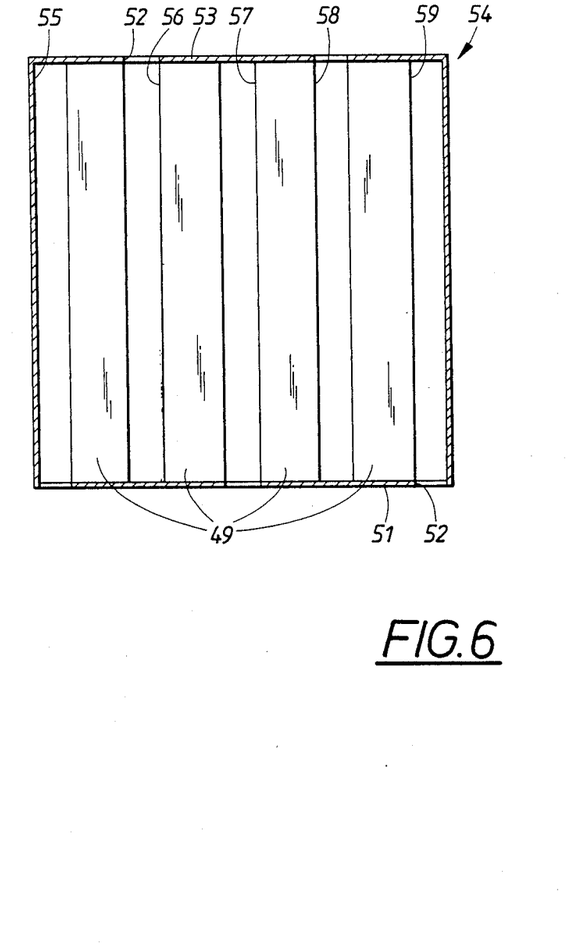
FIG. 6 shows the assembled filter in a section in a first design.

FIG. 6 shows how the filter units 49 can be arranged in the casing 54. FIG. 6 is a section through the casing parallel to the top and bottom sides shown in FIG. 5. The front 51 and rear side 53 emerge from FIG. 6 as the narrow openings 52 arranged in these sections. As emerges from the figure, the narrow openings in the front side 51 and rear side 53 are staggered relative to each other. In the middle of each of the narrow openings 52 there is a space, which spaces are five in number and designated 55–59. The spaces 55, 57 and 59 are located in the middle of one of the narrow openings 52 in the front side 51 but are terminated towards a closed section of the wall of the rear side 53. The remaining spaces 56 and 58 are located in the middle of two narrow openings in the rear side 53 and are terminated at a complete wall section on the front side 51.

This means that if a medium which is to be filtered passes in from the front side 51 in any of the spaces 55, 57 or 59, the medium must pass through one of the filter units 49 to the respective spaces 56 and 58 in order then to be passed in the filtered state out through the narrow openings in the rear side 53. The filter units 49 are arranged sealingly against the bottom and top of the casing 54 and against the inside of the front side 51 and rear side 53, so that no medium can pass round the filter unit without being forced through this material. The filter units 49, which are of the appearance shown in FIG. 4, are thus inserted with the edges which are formed by the band of material 24 and the two outermost folds of the filter material web 5.

The size of the casing 54 is adapted in such a way that, on the one hand, it accommodates the filter surface necessary for the intended purpose and, on the other hand, in such a way that it is suitable for insertion of several filter units of standard size. As mentioned, the length of the filter units can easily be altered in the automatized manufacturing process, and also its width with slightly greater insertion. In the case of extremely large filters, several filter units can be stacked on top of each other with joining of the band of material 24 at the meeting edges, in order in this way to bridge greater widths.

Figure 7:
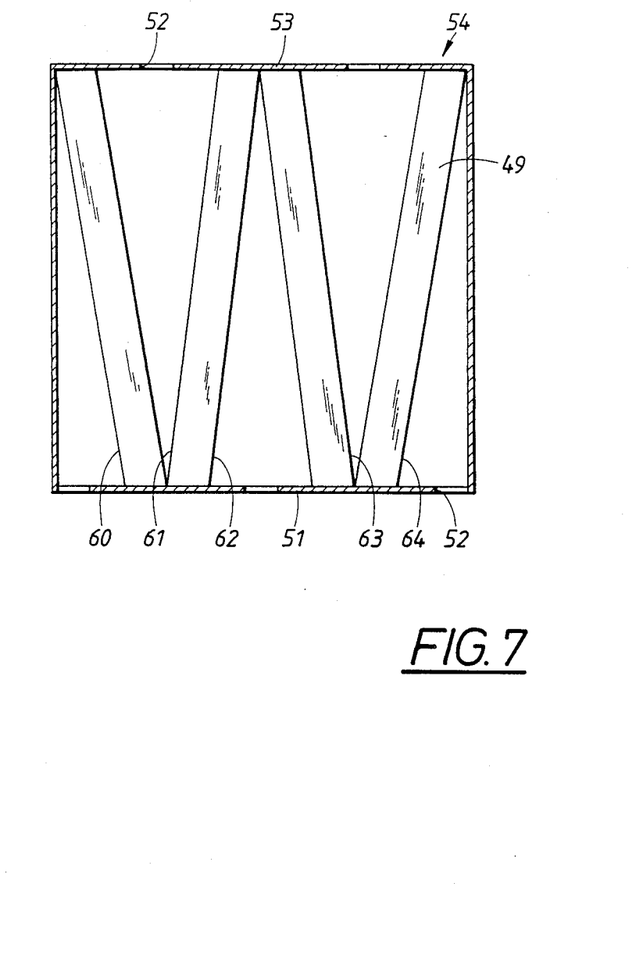
FIG. 7 shows the assembled filter in a section in a second design.

FIG. 7 shows another design of a filter with insertion of the filter units 49 into a casing of the type previously described, also designated here by 54. FIG. 7 again shows the front side 51 and rear side 53 and the narrow openings 52 in these sides. In this case, however, the filter units 49 are inserted obliquely so that, at the narrow openings, triangular spaces 60, 61, 62, 63 and 64 are formed in the section. The filter units 49 are thus situated between the spaces 60, 62 and 64, which are connected to the narrow openings 52 in the front side 51 and the spaces 61 and 63, which are connected to the narrow openings 52 in the rear side 53, and the medium, which is to be filtered, must pass through the filter material of the units in order to be able to flow from the narrow openings in the front side 51 to the narrow openings in the rear side 53.

The construction of filters in the casing 54 is shown in two examples, but other designs can also be achieved. The proportions and sizes of the casing can, of course, be varied within wide limits, still using the filter units 49. On application, the filters must be connected to the lines through which the medium, which is to be filtered, will pass. It is most expedient for the casings to be built into filter housings of, for example, metal, which connect sealingly with, on the one hand, the front side and, on the other hand, the rear side, in such a way that the medium must pass in through the narrow openings and out again after passing through the filter material.

Figure 8:
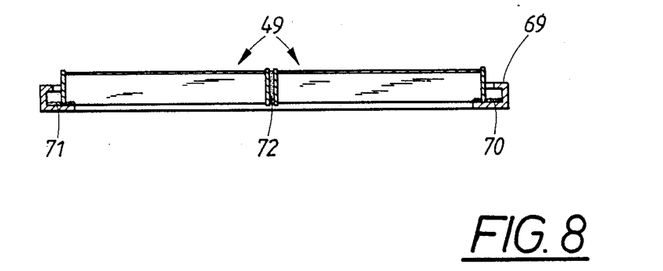
FIG. 8 shows an assembled filter of a second type in a section along the line VIII—VIII in FIG. 9.
Figure 9:
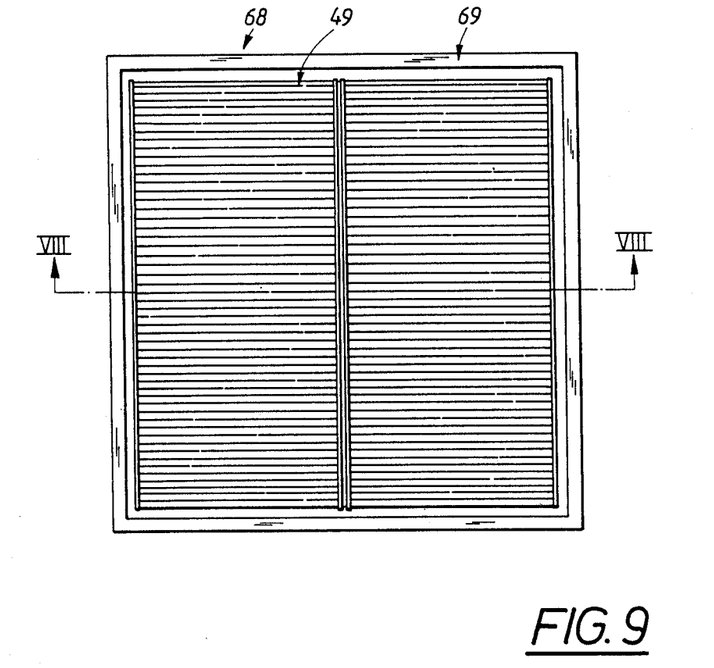
FIG. 9 shows the filter of FIG. 8 in view.

FIGS. 8 and 9 show an assembled filter which is of a type other than the previous one described in two variants. The filter is designated 68 and has an outer metal frame 69 of a C-shaped profile, as emerges from FIG. 8. The profile 69 has a wide flange which forms a bearing surface 70 which protrudes in towards the centre of the frame and extends over the remaining parts of the profile. Two of the mechanically manufactured filter units 49 are glued onto the surface 70. They thus stand on their out-turned long sides and on the frame-like surface 70 of the profile 69 and are attached to the surface by means of a layer of glue 71. Between each other, the two filter units 49 are joined by means of a layer of glue 72, which connects the long sides facing towards each other.

A filter of this type can be inserted into filter housings with frame-like positions which are arranged to sealingly accommodate a frame, such as the frame 69. The frames are generally designed to be relatively large, in an order of magnitude of over half a metre. In the case of extremely large frames, more than two filter units can be inserted in one frame.

Figure 10:
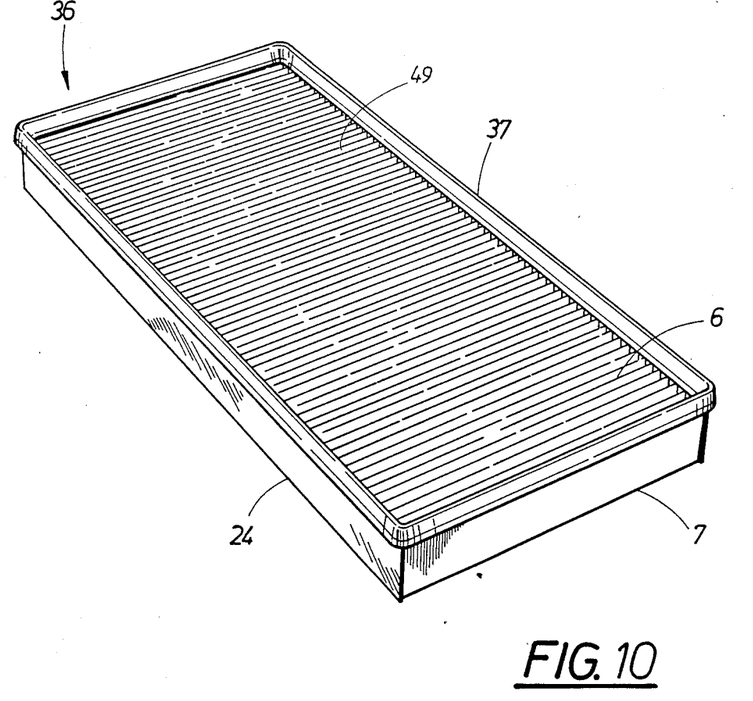
FIG. 10 shows a filter unit in perspective in a second design.

Finally, FIG. 10 shows a filter design in which the filter unit 49 has been able to form a filter 36 by being provided with a sealing strip 37 extending around the latter, preferably of an elastomeric material such as foamed plastic, which is cast directly onto the filter material. Such a filter can be used for direct insertion into a filter housing. The filter is not included in the invention but is shown as an example of the large extent over which the filter unit can be used.

This type of filter is used in large numbers and it has the same basic framework, as shown in FIG. 4, which, according to the invention, is thus also used as a filter unit, for assembly into larger filters which are manufactured in smaller numbers, but where mass production of the filter units can be used. There are thus achieved the said advantages of an automatized production at low cost of the majority of the filters in question, at the same time as which the filter units are manufactured with great precision. It is thus extremely important for the folds in the filter web to have an even distribution and a conical angle well matched to the depth. In the event of inaccuracies in this respect, the collecting capacity of the filter cannot be utilized to the full, because narrower areas become clogged up relatively quickly and the flow resistance through the filter eventually increases.

I claim:

1. A process for the production of a filter having an active filtering part made up of a folded filter material web, said web being delimited by side edges at which the folds terminate, and end edges at which a first or last fold is located, comprising the steps of: first producing a blank by creasing the filter material web and pushing the same together to form the folds with formation of predetermined spacings between the folds during advancement of the folded web; joining said side edges of the web by strips, such that the ends of the folds are covered over and fixed by the strips; cutting off the blank which comprises the folded material web and the strips arranged on its side edges, to form filter units; maintaining the spacings between the folds constant on application of the strips and during advancement by means of threads of at least one screw element pushing down between the folds, said threads thus form spacing elements; rotating the at least one screw element, such that the threads follow the folds during the advancement; and assembling several filter units in a casing to form a filter having a filter surface which corresponds to the combined surface of the units included, said casing having a box shape with a first side and a second side corresponding thereto, openings in each side, the filter units being arranged sealingly between said sides so that between said units spaces are formed which extend between the said first and second sides; each filter unit partly bordering on a space which is in communication with the openings on the first side and, at its second side, on a space which is in communication with the openings on the second side, so that a medium, which flows in through the openings on one side and out through the openings on the other side, must pass at least one wall formed by the filter material web of at least one of the filter units.

2. A process according to claim 1, wherein the filter units are arranged obliquely in the casing, so that pairs of the same form V-shapes and the said spaces acquire a triangular cross-section which widens in the direction of the side in which the opening to the respective space is located.

3. A process according to claim 1, wherein the filter units are arranged in rigid frames and then are joined to each other to form a surface which essentially corresponds to the surface comprised by the frame.

* * * * *